United States Patent
Lamothe et al.

(10) Patent No.: US 9,922,214 B2
(45) Date of Patent: Mar. 20, 2018

(54) RECEIVER UNIT FOR AN RF TAG

(71) Applicant: EM Microelectronic-Marin S.A., Marin (CH)

(72) Inventors: Christian Lamothe, Travers (CH); Thomas Coulot, Valdahon (FR); Goran Stojanovic, Neuchatel (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 15/084,671

(22) Filed: Mar. 30, 2016

(65) Prior Publication Data
US 2016/0300086 A1    Oct. 13, 2016

(30) Foreign Application Priority Data

Apr. 13, 2015   (EP) ................... 15163422

(51) Int. Cl.
| | |
|---|---|
| G06K 7/10 | (2006.01) |
| G05F 3/26 | (2006.01) |
| G08B 21/00 | (2006.01) |
| G08B 9/00 | (2006.01) |
| H03D 1/10 | (2006.01) |

(Continued)

(52) U.S. Cl.
CPC ......... G06K 7/10158 (2013.01); G05F 3/262 (2013.01); G06K 19/0715 (2013.01)

(58) Field of Classification Search
CPC .. G06K 7/10; G05F 3/26; G08B 21/00; G08B 9/00; H03D 1/10; H03D 1/04; H03H 7/40

USPC ................ 340/10.34, 572.8, 572.1, 572.4; 455/3.01, 107, 108; 235/492; 333/17.3; 329/350, 369, 370
See application file for complete search history.

(56) References Cited

U.S. PATENT DOCUMENTS 4,207,516 A * 6/1980 Babcock ............... H02M 3/139
                                                323/238
5,847,584 A * 12/1998 Pascucci ............... G05F 1/571
                                                327/68

(Continued)

OTHER PUBLICATIONS

European Search Report dated Sep. 17, 2015 in European Application 15163422, filed Apr. 13, 2015 (with English Translation).

(Continued)

*Primary Examiner* — Nam V Nguyen
(74) *Attorney, Agent, or Firm* — Oblon, McClelland, Maier & Neustadt, L.L.P.

(57) ABSTRACT

A receiver unit for a radio frequency (RF) tag is provided, including a first input terminal and a second input terminal each being connected to an antenna; a communication stage configured to demodulate and/or to modulate an incoming signal in the communication stage; and a power stage including a voltage converter circuit being configured to supply power to the receiver unit, and a regulation circuit being configured to limit an output voltage of the voltage converter circuit, wherein the regulation circuit includes a regulator circuit being configured to determine a first current value and a second current value, the second current value being a current value provided in addition to the first current value, and, if the second current value exceeds a predetermined threshold value, to supply a control signal to a limiter circuit configured to limit an input voltage of the voltage converter circuit.

10 Claims, 7 Drawing Sheets

(51) Int. Cl.
*H03D 1/04* (2006.01)
*H03H 7/40* (2006.01)
*G06K 19/07* (2006.01)

(56) References Cited

U.S. PATENT DOCUMENTS

| | | | | |
|---|---|---|---|---|
| 6,134,130 | A * | 10/2000 | Connell | G06K 19/0701 363/70 |
| 7,528,728 | B2 * | 5/2009 | Oliver | G06K 19/0723 340/572.1 |
| 7,800,436 | B2 * | 9/2010 | Yamazaki | H03D 1/18 329/350 |
| 7,941,091 | B1 * | 5/2011 | Doherty | H04H 20/63 455/272 |
| 7,971,794 | B2 * | 7/2011 | Leutgeb | H04L 27/04 235/451 |
| 8,749,319 | B2 * | 6/2014 | Rokhsaz | H03J 3/20 333/17.3 |
| 9,041,378 | B1 * | 5/2015 | Lam | H02M 3/156 323/271 |
| 9,075,422 | B2 * | 7/2015 | Vemula | G05F 1/573 |
| 9,111,187 | B2 * | 8/2015 | Cho | G06K 19/0715 |
| 2003/0104848 | A1 * | 6/2003 | Brideglall | G06K 7/0008 455/574 |
| 2003/0197598 | A1 * | 10/2003 | Hayashi | G06K 19/0723 455/41.1 |
| 2004/0036626 | A1 * | 2/2004 | Chan | A01K 11/006 340/870.17 |
| 2007/0164122 | A1 * | 7/2007 | Ju | G06K 19/0701 235/492 |
| 2008/0084310 | A1 * | 4/2008 | Nikitin | G06K 7/0008 340/572.7 |
| 2008/0267313 | A1 * | 10/2008 | Meltzer | H03D 1/22 375/268 |
| 2010/0079921 | A1 | 4/2010 | Fujita | |
| 2013/0099787 | A1 * | 4/2013 | Lu | H02M 3/3376 324/319 |
| 2013/0223116 | A1 | 8/2013 | Cho et al. | |
| 2014/0191568 | A1 * | 7/2014 | Partovi | H02J 7/025 307/9.1 |

OTHER PUBLICATIONS

Davor Vinko et al. "Modification of the Cockcroft-Walton Charge Pump by Using Switched Capacitors Technique for Improved Performance Under Capacitive Loads", WSEAS Transactions on Circuits and Systems, Issue 1, vol. 8, Jan. 2009, 10 pages.

* cited by examiner

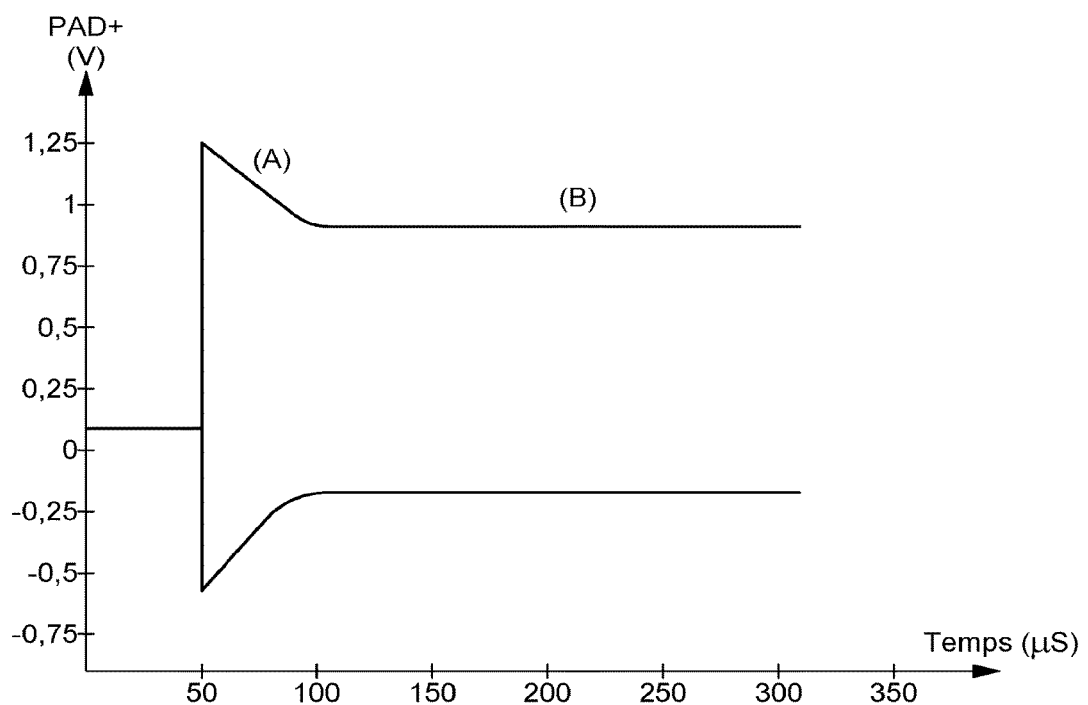

RECEIVER UNIT FOR AN RF TAG

This application claims priority from European Patent Application No. 15163422.7 filed 13 Apr. 2015, the entire disclosure of which is hereby incorporated herein by reference.

The present invention concerns a receiver unit comprising a first and a second input terminal to which are connected an antenna, a communication stage adapted to demodulate and/or modulate an incoming signal in said communication stage and a power stage comprising a voltage converter for powering the rest of the circuit.

BACKGROUND OF THE INVENTION

There are known radio frequency (RF) tags also called electronic labels or communication beacons provided with a communication circuit. This type of communication circuit comprises an antenna connected to a modulation/demodulation stage for processing an incoming signal or an outgoing signal. Such an RF tag is also provided with a power supply system, i.e. a stage that uses the energy received on reception of a signal to supply the entire RF tag with electrical energy.

This type of stage generally includes an AC/DC converter converting a received alternating signal into a continuous power signal. An AC/DC converter of this type takes the form, for example, of a diode bridge of the Graetz type.

However, depending on the type of incoming signals, it is necessary to have an AC/DC converter able to work not only at low power but also at high power.

Further, one problem of AC/DC converters is that they may have stray capacitances. Indeed, each antenna operates in an optimum manner with a tuning capacitor. It is therefore sought to control the value of the tuning capacitor associated with the antenna and therefore to reduce the value of stray capacitances so that they do not significantly disrupt the desired antenna characteristic. Therefore, as the AC/DC converter is the largest contributor to stray capacitances, it is important to select assemblies that minimise stray capacitance contribution.

Further, RF tags face a risk of the AC/DC converter being destroyed subsequent to excessively high voltage in the AC/DC converter, which causes damage to the components. A known solution is to clip the signal beyond a predetermined voltage value. However, one drawback of clipping the input signal is that it distorts the signal resulting in a loss of information.

SUMMARY OF THE INVENTION

It is therefore an object of the present invention to overcome the drawbacks of the prior art by providing an RF tag receiver unit which improves efficiency and which tolerates a large voltage variation in the input signal while avoiding voltage surges and signal distortions.

To this end, the invention proposes to provide a receiver unit comprising a first and a second input terminal to which are connected an antenna, a communication stage adapted to demodulate and/or modulate an incoming signal in said communication stage and a power stage comprising a voltage converter for providing the power supply for a unit, characterized in that the power stage further includes a regulation circuit adapted to limit the output voltage of the voltage converter, said regulation circuit comprising a regulator circuit adapted to determine a second current value, said second current value being the current value provided in addition to the first current value, the regulator circuit supplying a control signal if the second current value exceeds a predetermined threshold value, the control signal being sent to a limiter circuit arranged to limit the input voltage of the AC/DC converter circuit.

In a first advantageous embodiment, the voltage converter is of the alternating/continuous type.

In a second advantageous embodiment, the voltage converter includes, at input, an earth generator composed of first and second N-type metal-oxide-semiconductor (MOS) transistors connected to each other such that their sources are connected to each other to form the earth of the voltage converter, the drain of the first transistor being connected to the first input terminal and to the gate of the second transistor whereas the drain of the second transistor is connected to the second input terminal and to the gate of the first transistor, the voltage converter further comprising a plurality of identical structures forming a voltage modifier part, and in that said converter output includes two N-type MOS transistors wherein the sources of the transistors are connected to each other to form the output line, the drain of one of the transistors being connected to the last structure of the voltage modifier part extending from the first terminal, the drain of the other transistor being connected to the last structure of the voltage modifier part extending from the second terminal, the gate of each transistor being connected to its source.

In a third advantageous embodiment, the voltage modifier part is arranged so that, from each of the first and second input terminals, there extends a series of identical structures connected to each other, the first structure of each series being connected to one of the first and second input terminals and to the following structure, the connection point between two structures being connected to one of the first or second input terminals so that each structure is connected to the first terminal and to the second terminal.

In a fourth advantageous embodiment, the limiter circuit includes at least one transistor connected via its drain to the first input terminal and via its source to the second input terminal, the control signal being sent to the gate thereof in order to make said at least one transistor more or less conducting.

In a fifth advantageous embodiment, the limiter circuit includes a plurality of transistors mounted in parallel.

In a sixth advantageous embodiment, the regulation unit further includes a bandgap voltage generator for supplying the polarization currents and the reference voltage to the regulator circuit.

In another advantageous embodiment, the communication stage is adapted to provide a signal representative of a communication action which is directly connected to the limiter circuit to prevent regulation during such a communication action.

The invention further concerns an RF tag comprising a control unit including a calculation unit and a memory for performing at least one function, and at least one receiver unit arranged to receive or send a signal and to supply power to said control unit, characterized in that said receiver unit is a receiver unit according to the invention.

In a first advantageous embodiment, the receiver unit is arranged to operate according to a first protocol using a first frequency.

In a second advantageous embodiment, the first protocol is a long distance protocol.

In a third advantageous embodiment, the RF tag further comprises a second receiver unit which is arranged to operate according to a second protocol using a second frequency, said second receiver unit comprising a communication stage and a power stage for supplying a current for a unit, said control unit receiving a current whose value is the sum of the currents from the first receiver unit and from the second receiver unit.

In another advantageous embodiment, the first receiver unit further includes a current mirror circuit used to supply a signal representative of a current which is the image of the sum of the currents of the first and second receiver units, the second receiver unit further comprising a current mirror circuit used to supply a signal representative of a current which is the image of the current supplied by the second receiver unit and in that the first receiver unit further includes a subtractor circuit for subtracting the current being the image of the sum of the first and second receiver unit currents from the current being the image of the current supplied by the second receiver unit and for supplying, to the limiter circuit, a signal representative only of the current from the first receiver unit.

BRIEF DESCRIPTION OF THE DRAWINGS

The objects, advantages and features of the device according to the present invention will appear more clearly in the following detailed description of at least one embodiment of the invention, given solely by way of non-limiting example and illustrated by the annexed drawings, in which:

FIG. 8 is a schematic view of the temporal behaviour of the RF tag regulation system according to the invention.

DETAILED DESCRIPTION

Figure 1A:
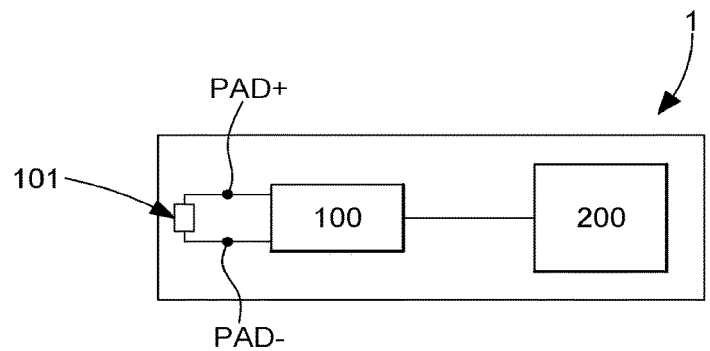
FIGS. 1a and 1b are schematic views of the RF tag and the receiver unit according to a first embodiment of the present invention.
Figure 1B:
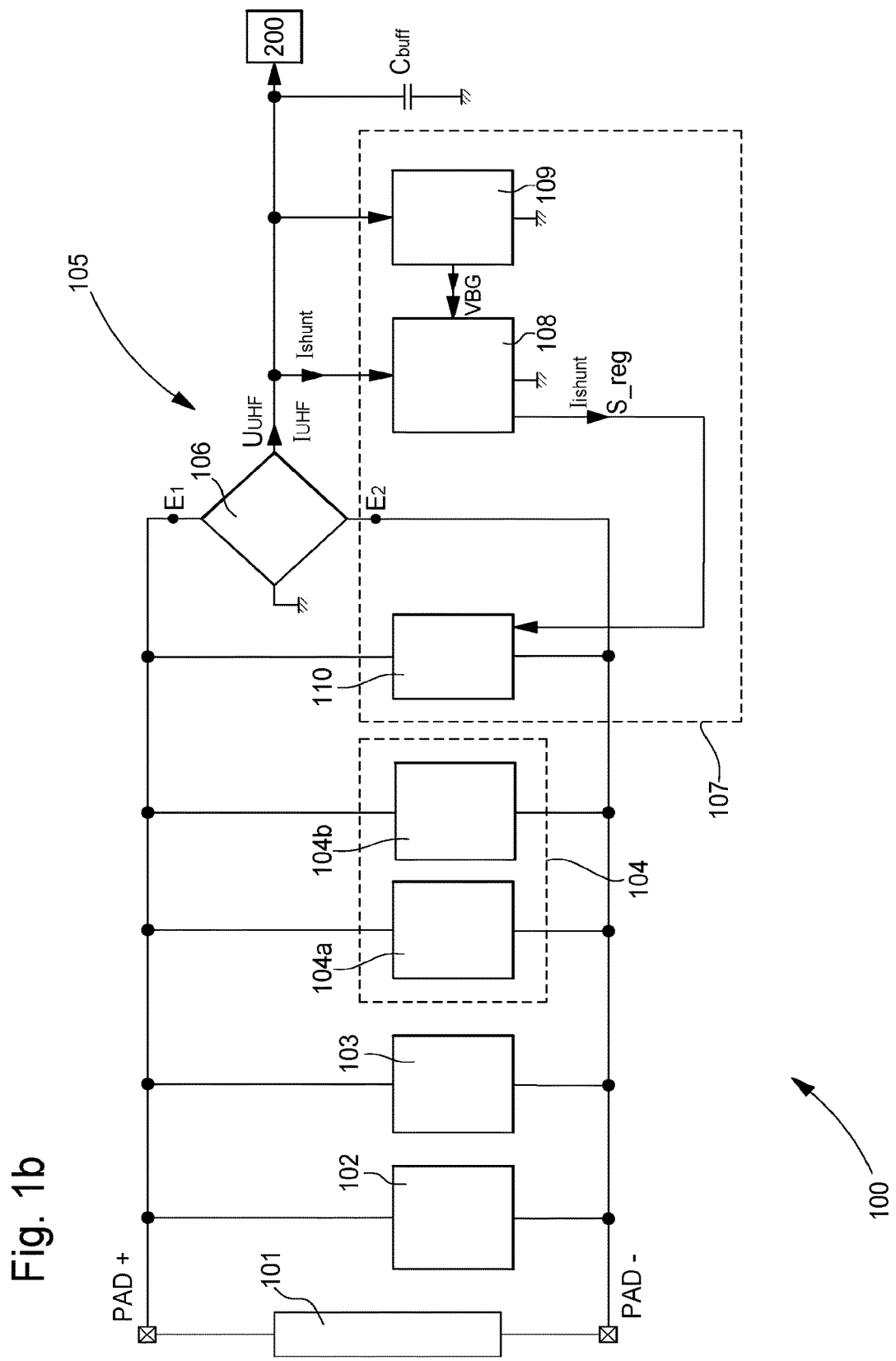

FIG. 1a shows a receiver unit 1 of an RF tag also called a communication beacon or electronic label, and more specifically a receiver unit 100 according to a first embodiment. A receiver unit 100 of this type, seen in FIG. 1b, of such a RF tag is connected, at input, to an antenna 101 via two input terminals (PAD+, PAD−) namely a positive input and a negative input. This antenna 101 may be a dipole or a coil or any element capable of performing the antenna function. RF tag 1 further includes a control unit 200 comprising, for example, a calculation unit and a memory for performing at least one function. Here, the receiver unit 100 is used to operate with a long range UHF protocol. Across the two input terminals PAD+, PAD−, a plurality of stages are connected to each other, each stage being connected via one of its terminals to the positive terminal and via another of its terminals to the negative terminal. First of all, there is an adjustment stage 102 comprising a multitude of capacitors mounted in parallel and able to be actuated to be added or not added in order to adjust adaptation with the antenna, the resonant frequency and the quality factor.

A second stage 103 consists of a protection stage. This ESD protection stage protects against electrostatic discharges. This protection stage 103 is generally provided with diodes and/or thyristors. A third stage consists of a communication stage 104. This communication stage consists of a modulator part 104a for sending a signal via the antenna and/or of a demodulator part 104b for processing the signal received via the antenna.

A fourth stage consists of a power stage 105, i.e. the stage which, by using the power from the incoming signal, can supply electrical energy for the rest of the RF tag.

This fourth stage includes a voltage converter 106 for converting an input voltage into a different output voltage. In the present case, this is an AC/DC conversion. This circuit provides a rectified voltage Uuhf and a current Iuhf from an alternating voltage.

Figure 2:
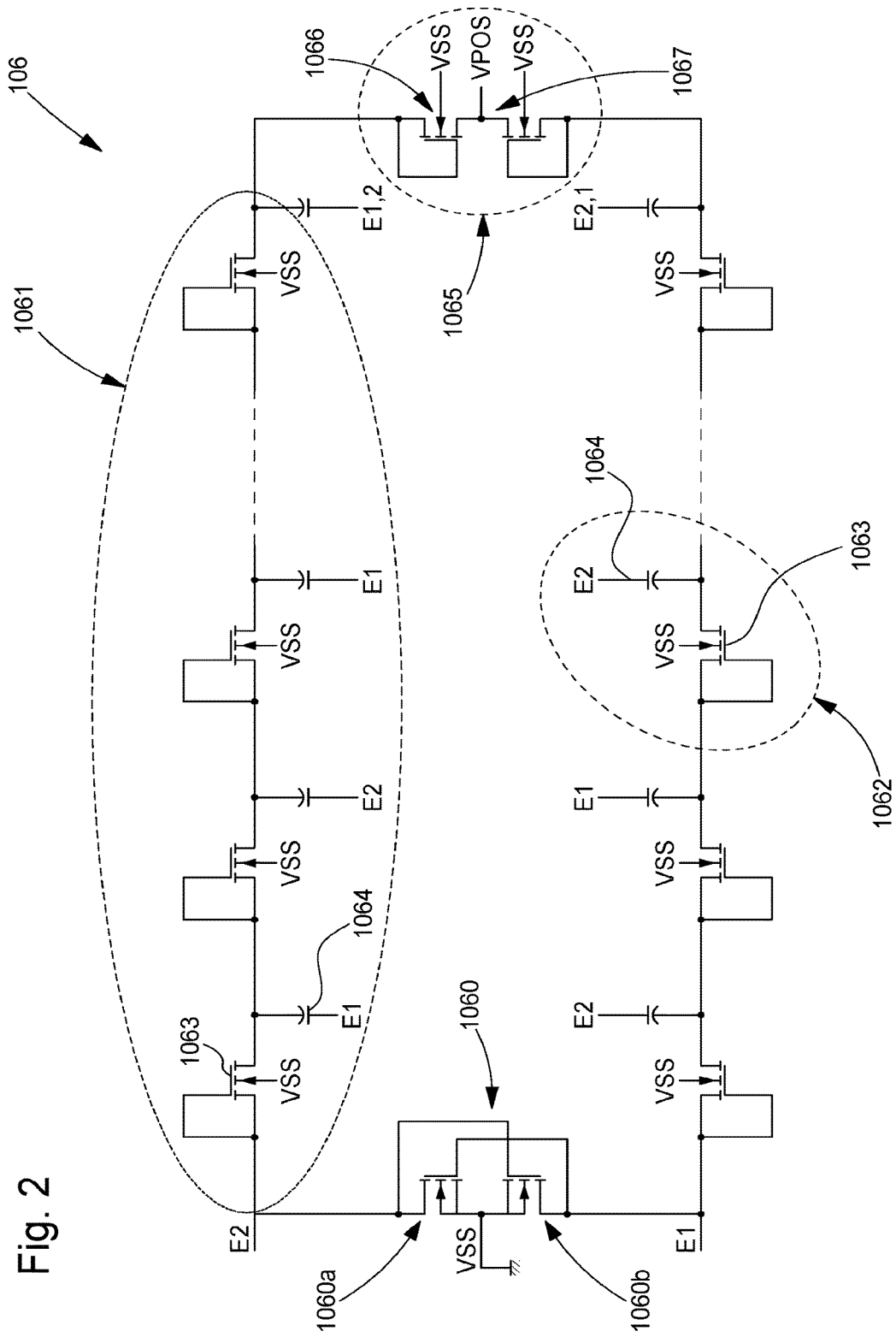
FIG. 2 is a schematic view of an AC/DC converter of the receiver unit according to the present invention.

In a preferred example, the voltage converter 106 is an AC/DC converter using a Cockcroft-Walton structure which is modified and symmetrical as seen in FIG. 2. This AC/DC converter 106 includes two input terminals E1, E2, which are connected to the two input terminals PAD+, PAD− of the RF tag. An earth generator 1060 is arranged at the input, between the two inputs E1, E2, this earth generator being composed of two N-type MOS transistors, 1060a and 1060b. The sources of the two transistors 1060a and 1060b are connected to each other to form ground voltage VSS while the gate of each transistor 1060a, 1060b is connected to the drain of the other transistor, each drain being connected to one of terminals E1, E2.

The structure then includes a boosting part 1061. Identical structures 1062 are connected in series from each input terminal E1, E2. These structures 1062 extending from each terminal E1, E2, are arranged such that the first structure 1062 extending from terminal E1 and the first structure extending from terminal E2 form a voltage modifier stage, and so on. AC/DC voltage converter 106 thus includes N voltage modifier stages.

Each structure 1062 includes an N-type MOS transistor 1063 whose gate is connected to the drain of said transistor. The source of transistor 1063 is also connected to the drain of the transistor 1063 of the next structure 1062 and also to a capacitor 1064 mounted in parallel, the latter is used to supply extra power during a boost and is also connected to one of the input terminals E1, E2.

The connection of capacitor 1064 to input terminals E1, E2 is alternated such that if the capacitor 1064 of one structure 1062 is connected to terminal E1, then the capacitor 1064 of the next structure 1062 is connected to terminal E2 and so on.

This configuration is also arranged such that the capacitor 1064 of the first structure 1062, in which the drain of transistor 1063 is connected to terminal E1, will be connected to terminal E2, whereas the capacitor 1064 of the first structure 1062, in which the drain of transistor 1063 is connected to terminal E2, will be connected to terminal E1.

In the last structure 1062 of each line, the source of transistor 1063 is connected to a collector part 1065. This collector includes two N-type MOS transistors 1066, the sources of transistors 1066 being connected to each other to form the VPOS output 1067. The drains of one of transistors 1066 is connected to the source of the transistor 1066 of the last structure of line E1, and the drain of the other is connected to the source of the transistor of the last structure of line E2. Further, the gate of each transistor 1066 is connected to its source.

This configuration makes it possible to obtain an AC/DC converter 106 with low stray capacitance which is a characteristic sought by the present invention.

At the output of this AC/DC converter 106, the fourth stage 105 advantageously includes a regulation circuit 107. This regulation circuit 107 is used to prevent destruction of the transistors of AC/DC converter 106 when the voltage is boosted.

Indeed, AC/DC converter circuit 106 is also a booster circuit. However, the components are likely to be damaged when the voltage becomes too high.

Regulation circuit 107 includes first of all a regulator circuit as the shunt voltage regulator 108 connected via one of its inputs to the output of the AC/DC converter and via one of its outputs to ground.

Figure 3:
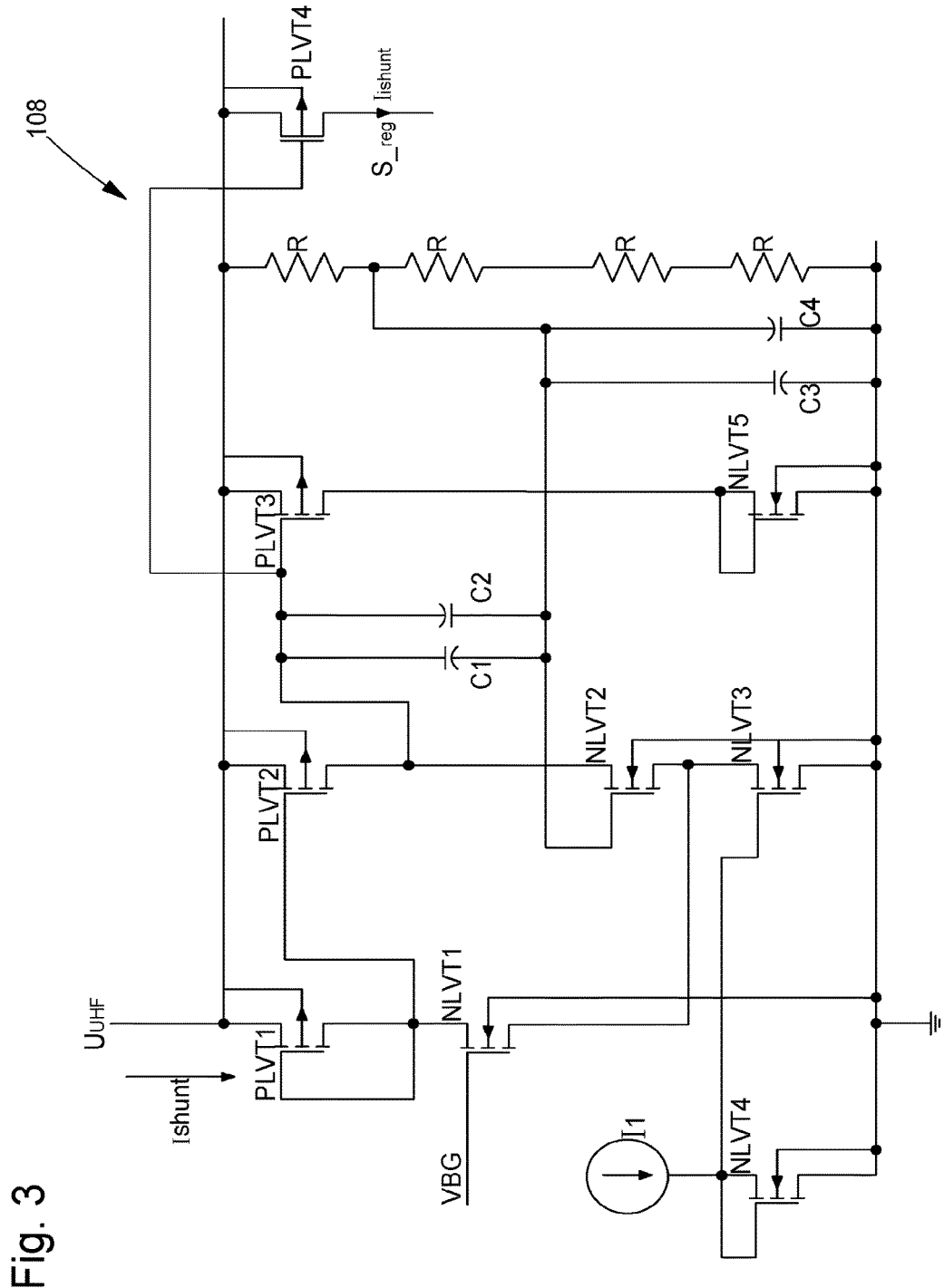
FIG. 3 is a schematic view of a shunt voltage regulator of the receiver unit according to the present invention.

A shunt voltage regulator 108 of this type, seen in FIG. 3, comprises a first input connected to the drain of three P-type MOS transistors PVLT1, PVLT2 and PVLT3. The gate of transistor PVLT1 is connected to the source of the latter and to the gate of transistor PVLT2. The source of transistor PLVT2 is connected to the gate of transistor PLVT3. A series of four resistors R is also connected to the first input, these resistors R being connected in series with each other and thus connected between the first input and the ground.

This shunt voltage regulator 108 further includes a first N-type MOS transistor NVLT1 whose gate is a second input for connection of a reference voltage VBG. The drain of this transistor NVLT1 is connected to the source of transistor PLVT1, whereas the source of transistor NLVT1 is connected to a pair of N-type MOS transistors NLVT2 and NLVT3. More specifically, the source of transistor NLVT1 is connected to the source of transistor NLVT2, the drain of the latter is connected to the source of transistor PLVT2 and the gate thereof is connected to the connection point between the first and second resistors R of the series of resistors. Further, capacitors C1, C2, C3 and C4 are arranged to be connected in parallel between the gate of transistor PLVT3 and the gate of transistor NLVT2 and between the gate of transistor NLVT2 and the ground.

The source of transistor NLVT1 is also connected to the drain of transistor NLVT3, the source of the latter is also connected to the ground and the gate thereof is connected to the gate of a fourth transistor NLVT4. This transistor NLVT4 is connected via its drain and gate to a current polarization source I1 and via its source to the ground.

Finally, the shunt voltage regulator includes a fifth transistor NLVT5 whose gate and drain are connected to the source of transistor PLVT3 and whose source is connected to the ground. This shunt voltage regulator 108 may be associated with a bandgap reference voltage generator 109 supplying a reference voltage VBG and connected to the gate of transistor NLVT1 of shunt voltage regulator 108.

This type of shunt voltage regulator 108 is used to measure the current $I_{shunt}$ supplied in addition to the current consumed by control unit 200. Indeed, the principle of regulation relies on the fact that the current supplied by AC/DC converter 106 is partly absorbed by the RF tag circuit, i.e. the control part 200, the surplus, i.e. current $I_{shunt}$ being directed towards shunt voltage regulator 108.

The regulation current from the shunt regulator flows mainly into PLVT3. MOS transistor PLVT4 takes an image of this shunt current $I_{shunt}$ in order to adjust the characteristics of the AC/DC converter protection circuit.

There is therefore a correlation between the output current and the input voltage of AC/DC converter 106 so that there is a maximum input voltage of AC/DC converter 106 at which the voltage boost does not cause damages or destruction. Thus, this maximum current value is used as a regulation tool. In one example, this maximum current value will be set at 100 μA, the current consumed by control unit 200 being on the order of 10 μA. The shunt voltage regulator 108 is used to supply a regulation signal S_reg which is a function of the output voltage of AC/DC converter 108.

Figure 4:
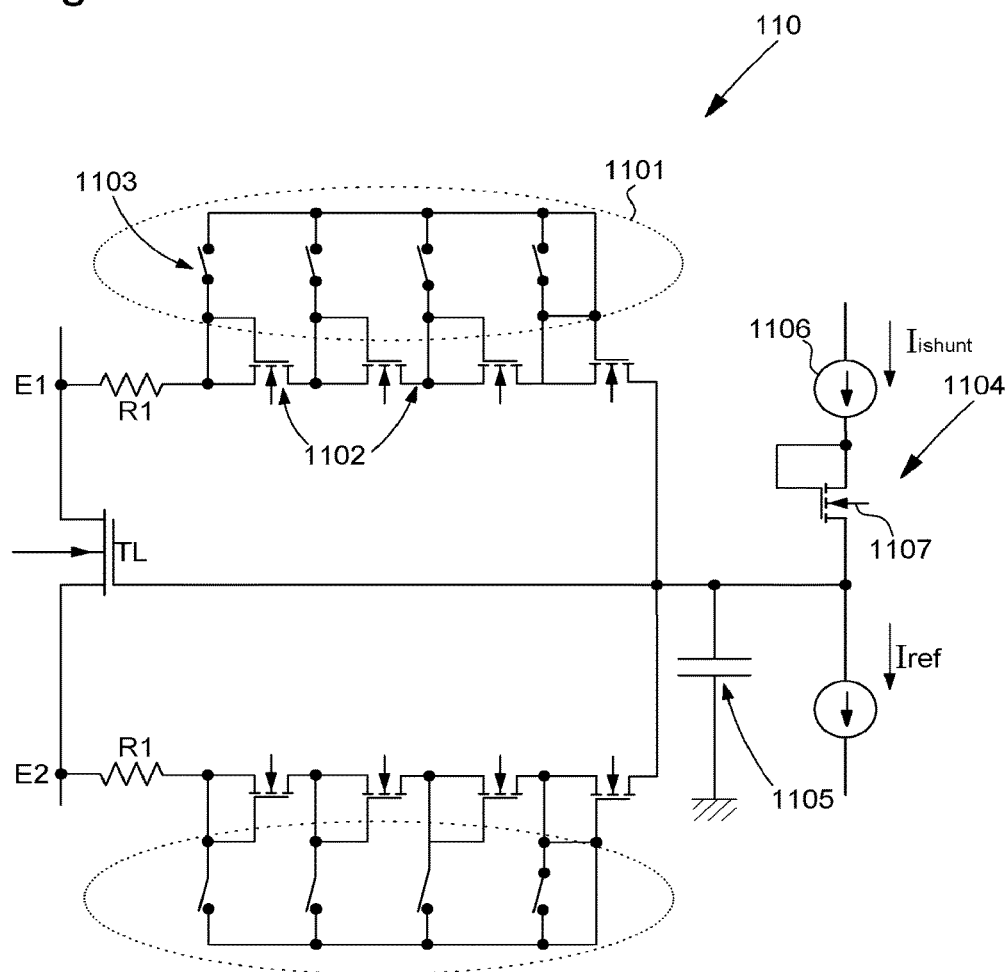
FIG. 4 is a schematic view of a limiter circuit of the receiver unit according to the present invention.

This regulation signal S_reg with a current value is sent to a clipping or limiter circuit 110 seen in FIG. 4. This limiter stage 110 is connected in parallel between terminals PAD+, PAD− just before AC/DC converter 108. This limiter stage 110 includes at least one limiter transistor TL connected between terminals E1 and E2 connected to input terminals PAD+, PAD−.

From each input terminal PAD+, PAD− there extends a resistor R1 connected in series with a switch structure 1101, this switch structure 1101 includes four N-type MOS transistors 1102 connected such that the first transistor is connected to resistor R1 via its drain and to second transistor 1102 via its source and so on.

Further, each switch structure 1101 includes a number of switches 1103 equal to the number of transistors, switches 1103 being connected to each other via one of their terminals and each connected to a drain and a gate of a transistor 1102 via the other terminal. These switch structures 1101 are used to create a fast path to control the gate of transistor TL, if, for example, a voltage surge appears across inputs PAD+, PAD−. This fast path provides a kind of second ESD protection.

These last transistors 1102 of each structure 1101 are connected to each other. At this connection point, a connection is created to the gate of limiter transistor TL, but also to an input module 1104, the latter includes a capacitor 1105 mounted in parallel, in addition to two current sources 1106a. A first current source 1106 is arranged to supply the current of the shunt voltage regulator output signal S_reg, i.e. the image $I_{ishunt}$ of shunt current $I_{shunt}$. The drain of an N-type MOS transistor 1107 is connected tp the output of this current source, its gate being connected to its drain. Transistor 1107 is also connected, via its source, to a second current source 1106b whose value is a reference value Iref provided by bandgap reference voltage generator 109.

This limiter stage 110 is used to limit the incoming voltage in AC/DC converter 106 of the fourth stage by acting on the gate of limiter transistor TL.

As long as the current $I_{ishunt}$ sent from the signal S_reg sent from shunt voltage regulator 108 is lower than or equal to reference current Iref, then nothing happens and transistor TL is not actuated.

Conversely, if the sent current $I_{ishunt}$ becomes greater than reference current Iref, then there is no longer a balance between the two current sources 1106 and the extra current is sent to the gate of limiter transistor 106. This flow of current to the gate of limiter transistor TL causes it to close and thus limiter transistor TL becomes less conductive, causing a voltage drop in AC/DC converter 106. Thus, the current provided by AC/DC converter 106 decreases so that the current $I_{ishunt}$ from control signal S_reg sent by shunt voltage regulator 108 decreases and acts to a greater or lesser extent on limiter transistor TL.

One advantage of limiter stage 110 is that it is linear, i.e. it does not clip or distort the input signal, it simply changes the scale of said signal.

Another advantage of this limiter stage 110 is that it has a regulating effect on the voltage at input terminals PAD+, PAD− by maintaining the voltage at these input terminals PAD+, PAD− within a voltage range compatible with proper operation of said RF tag, whereas the second stage 103 or protection stage provided with protection diodes, does not. For example, using only the protection diodes, the voltage at the input of an AC/DC converter with 5 stages could reach 2 volts, which, with a multiplication ratio approximately equal to 4, would generate a voltage of 8 volts at the converter transistor terminals, and therefore a risk of destruction of the transistors which usually operate at 2 volts.

The power range allowed by this limiter stage 110 ranges from −20 dBm to +25 dBm for an input voltage of control unit 200 ranging from several tens of millivolts to several tens of volts.

The regulation proposed uses a transfer function to operate. This transfer function is the following function:

$$H = \frac{V_{ant}}{e_g} = \frac{\tau_c \times S/(1+\tau_r \times S)}{(1+\tau_c \times S) \times \left(1 + \left(\frac{\tau_r}{\tau_c}\right) + \tau_r \times S\right)}$$

where $\tau_c$ is the time constant due to the components of limiter 110 and capacitor 1105,
where $\tau_r$ is the time constant due to the components of the regulation circuit and buffer capacitor Cbuff,
where $e_g$, is the induced voltage amplitude in the antenna related to received energy and available through the received signal field, and $V_{ant}$ is the effective voltage amplitude at input terminals PAD+, PAD− controlled by limiter circuit 110 to maintain a reasonable voltage in AC/DC converter 106.

Since $\tau_r \ll \tau_c$, where $\tau_c \approx 1.7$ μs and $\tau_r = 5$ ns, the transfer function becomes:

$$H \approx \frac{\tau_c \cdot s}{1 + \tau_c \cdot s}$$

This transfer function makes it possible to obtain a stable first order function, as seen in FIG. 8 in which a large amplitude of oscillation (A) at the start stabilises in time to obtain a stable regime (B).

In a variant, the limiter transistor TL consists of a plurality of transistors connected in parallel.

Figure 5:
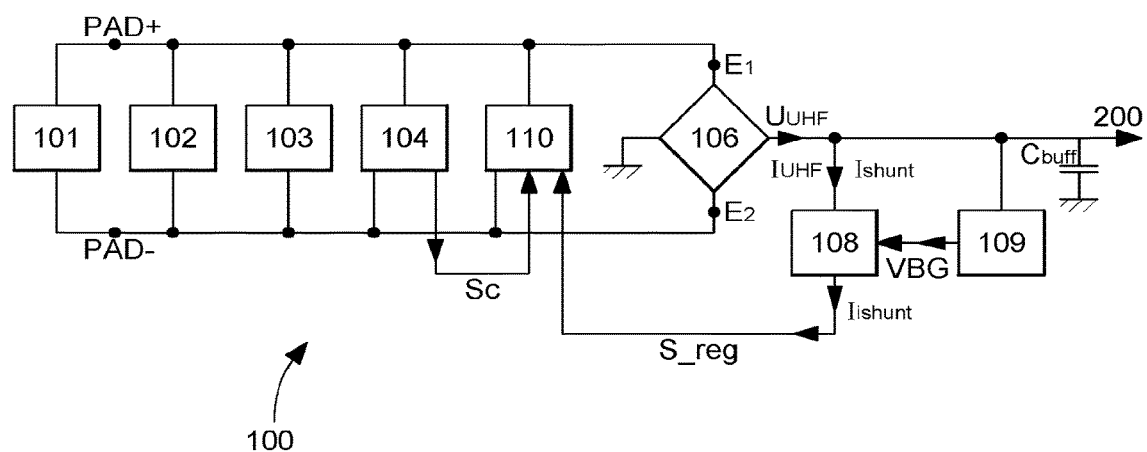
FIG. 5 shows a schematic view of a variant of the receiver unit according to the present invention.

In another variant seen in FIG. 5, the third stage or communication stage 104 is used for regulation. This variant takes account of voltage variations related to demodulation when a signal is received. Indeed, it may happen that, when the signal is processed, a voltage variation causing a drop in value is detected by the shunt voltage regulator and considered as a voltage loss. Shunt voltage regulator 108 could then open limiter transistor TL to allow more voltage to flow to the AC/DC converter. However, this voltage drop is only temporary and could cause a voltage surge in the AC/DC converter and damage it.

Therefore, a signal Sc from third stage 104 representative of a communication action is connected to limiter circuit 110 to prevent regulation during such a communication action.

The present variant advantageously takes account of voltage variations so that on reception of a signal by the antenna, regulation is shunted to prevent it being triggered, particularly in the event of a voltage drop in the modulated signal.

Figure 6:
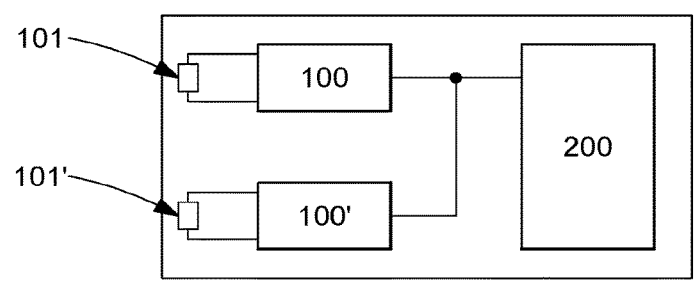
FIGS. 6 and 7 show schematic views of an RF tag according to a second embodiment of the present invention.
Figure 7:
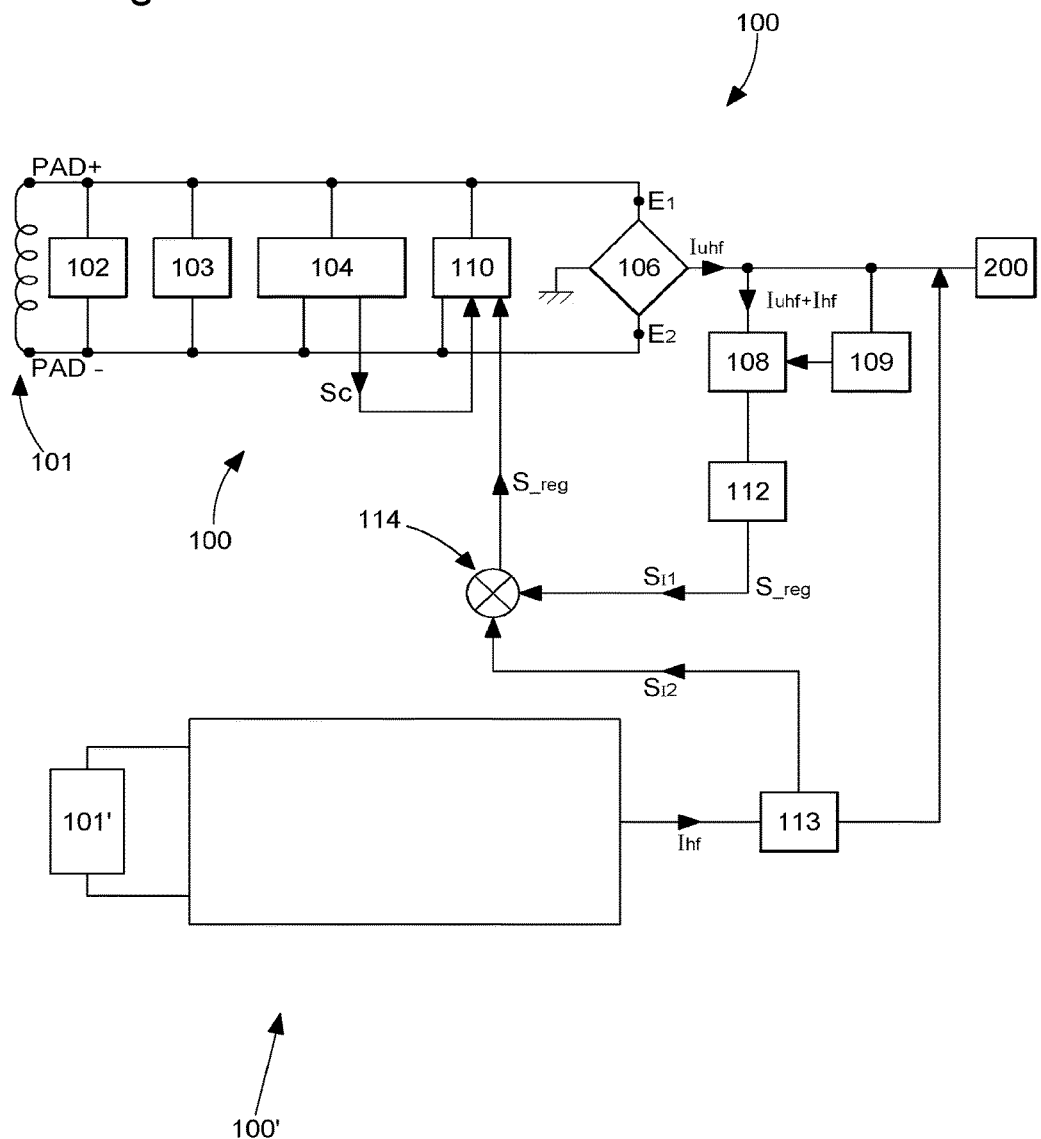

In a second embodiment seen in FIG. 7, it is conceivable that the RF tag is a dual frequency RF tag. Such an RF tag thus includes two receiver units 100, 100', a first unit 1' do operating according to a first protocol (P1) at a first frequency (F1) and the second unit 100', connected to an antenna 101' operating according to a second protocol (P2) at a second frequency (F2) as seen in FIG. 6. For example, a first receiver unit 100 operates at UHF, i.e. with a long distance protocol, whereas second receiver unit 100' operates at HF, i.e. with a short distance protocol.

In that case, it is the UHF receiver unit that supplies the current Iuhf for the RF tag control unit. The HF receiver unit also supplies current Ihf so that control unit 200 is connected both to the UHF receiver unit and to the HF receiver unit so that the current received by control unit 200 is the sum of currents Iuhf and Ifh, i.e. the current Ihf+Iuhf.

It therefore becomes necessary to adjust the current from the second receiver unit 100' in order to be taken into account for regulation to prevent distortion.

Regulation loop 107 further includes a current mirror circuit 112 used to supply a signal $S_{f1}$ representative of a current I1 which is the image of the current whose value is the sum of currents Iuhf and Ihf.

Second receiver unit 100' further includes a current mirror circuit 113 used to supply a signal $S_{f2}$ representative of a current I2 which is the image of current Ihf.

Signal $S_{f1}$ representative of current I1, which is the image of currents Iuhf+Ihf, and signal $S_{f2}$ representative of current Ihf, are then sent to a subtractor 114, which is connected to limiter circuit 110. Current I1 and current I2 are connected to subtractor 114 so that the latter calculates the difference between I1 and I2, i.e. the following operation: Iuhf+Ihf−Ihf.

The result is a signal S_reg representative of the current Iuhf used for regulation in limiter circuit 110.

It will be clear that various alterations and/or improvements and/or combinations evident to those skilled in the art may be made to the various embodiments of the invention set out above without departing from the scope of the invention defined by the annexed claims.

Of course, the first receiver unit 100 and second receiver unit 100' may have an identical or different structure. Likewise, the second receiver unit 100' could be arranged to include a regulation loop like that described for the first receiver unit 100.

What is claimed is:
1. A receiver unit for a radio frequency (RF) tag, comprising:
  a first input terminal and a second input terminal each being connected to an antenna;
  a communication stage configured to demodulate and/or to modulate incoming signal in the communication stage; and
  a power stage comprising a voltage converter circuit being configured to supply power to the receiver unit, and a regulation circuit being configured to limit an output voltage of the voltage converter circuit,
  wherein the regulation circuit comprises a regulator circuit being configured to determine a first current value and a second current value, the second current value being a current value provided in addition to the first current value, and, if the second current value exceeds a predetermined threshold value, to supply a control signal to a limiter circuit configured to limit an input voltage of the voltage converter circuit,
  wherein the voltage converter circuit includes, at input thereof, an earth generator including a first N-type metal-oxide-semiconductor (MOS) transistor and a second N-type MOS transistor connected to each other such that respective sources thereof are connected to each other to fort a ground of the voltage converter circuit, wherein a drain of the first N-type MOS transistor is connected to the first input terminal and to a gate of the second N-type MOS transistor, wherein a drain of the second N-type MOS transistor is connected to the second input terminal and to a gate of the first N-type MOS transistor, wherein the voltage converter circuit further comprises a plurality of identical structures configured to form a voltage modifier part, and wherein the voltage converter circuit includes, at output thereof, two N-type MOS transistors, where respective sources thereof are connected to each other and are configured to form an output line, a drain of one of the two N-type MOS transistors being connected to a last one of the plurality of identical structures forming the voltage modifier part and extending from the first input terminal, a drain of the other one of the two N-type MOS transistors being connected to the last one of the plurality of identical structures forming the voltage modifier part and extending from the second input terminal, and a respective gate of each of the two N-type MOS transistors being connected to a respective source thereof.

2. The receiver unit according to claim 1, wherein the voltage converter circuit is an alternating current/direct current (AC/DC) converter.

3. The receiver unit according to claim 1, wherein the voltage modifier part is configured such that there extends, from each of the first and second input terminals, a series of the plurality of identical structures connected to each other, a first structure of said series being connected to one of the first and second input terminals and to a following structure of said series, a connection point between two structures of said series being connected to one of the first or second input terminals such that each structure of the two structures is connected to the first terminal and to the second terminal.

4. The receiver unit according to claim 1, wherein the limiter circuit includes at least one transistor connected via a drain thereof to the first input terminal and via a source thereof to the second input terminal, the control signal being supplied to a gate thereof in order to increase or decrease a conductivity of said at least one transistor.

5. The receiver unit according to claim 4, wherein the at least one transistor of the limiter circuit includes a plurality of transistors mounted in parallel.

6. The receiver unit according to claim 1, wherein the regulation circuit further comprises a bandgap voltage generator configured to supply a reference voltage and polarization currents to a shunt voltage regulator.

7. The receiver unit according to claim 1, wherein the communication stage is further configured to provide a signal, representative of a communication action, directly to the limiter circuit to prevent regulation during the communication action.

8. A radio frequency (RF) tag, comprising:
a controller including a calculator and a memory;
at least one receiver unit for the RF tag, configured to receive or to send a signal and to supply power to said controller, wherein said at least one receiver unit is a receiver unit according to claim 1; and
a second receiver unit configured to operate according to a second protocol using a second frequency, said second receiver unit being further configured to supply a current, said controller being configured to receive a current having a value that is a sum of currents received from the first receiver unit and from the second receiver unit,
wherein the at least one receiver unit further comprises a first current mirror circuit configured to supply a signal representative of a current, which is an image of a sum of currents from the at least one receiver unit and the second receiver unit,
wherein the second receiver unit further comprises a second current mirror circuit configured to supply a signal representative of a current, which is an image of a current supplied by the second receiver unit, and
wherein the at least one receiver unit further comprises a subtractor circuit configured to subtract the current that is the image of said sum of currents from the current that is the image of the current supplied by the second receiver unit, and to supply, to the limiter circuit, a signal representative only of the current from the at least one receiver unit.

9. The RF tag according to claim 8, wherein the t least one receiver unit is configured to operate according to a first protocol using a first frequency.

10. The RF tag according to claim 9, wherein the first protocol is a long-distance protocol.

* * * * *

UNITED STATES PATENT AND TRADEMARK OFFICE
CERTIFICATE OF CORRECTION

PATENT NO. : 9,922,214 B2
APPLICATION NO. : 15/084671
DATED : March 20, 2018
INVENTOR(S) : Christian Lamothe et al.

Page 1 of 1

It is certified that error appears in the above-identified patent and that said Letters Patent is hereby corrected as shown below:

In the Specification

Column 6, Line 34, delete "tp" and insert --to--.

Column 7, Line 29, delete "$\tau$," and insert --$\tau_r$--.

Column 8, Line 9, delete "Ifh," and insert --Ihf,--.

In the Claims

Column 8, Line 47, Claim 1, after "modulate" insert --an--.

Column 8, Line 66, Claim 1, delete "fort" and insert --form--.

Column 10, Line 39, Claim 9, delete "t" and insert --at--.

Signed and Sealed this
Twenty-first Day of April, 2020

Andrei Iancu
*Director of the United States Patent and Trademark Office*